US009826507B2

(12) United States Patent
Kang

(10) Patent No.: US 9,826,507 B2
(45) Date of Patent: Nov. 21, 2017

(54) METHOD FOR SETTING A FILTER COEFFICIENT FOR A COMMUNICATION SYSTEM

(75) Inventor: Tae-Gil Kang, Seoul (KR)

(73) Assignee: Advanced RF Technologies, Inc., Burbank, CA (US)

( * ) Notice: Subject to any disclaimer, the term of this patent is extended or adjusted under 35 U.S.C. 154(b) by 1432 days.

(21) Appl. No.: 14/998,024

(22) Filed: May 2, 2012

(65) Prior Publication Data

US 2016/0374052 A1    Dec. 22, 2016

(30) Foreign Application Priority Data

Dec. 6, 2011    (KR) .................. 10-2011-0129508

(51) Int. Cl.
  *H04W 72/02*    (2009.01)
  *H04W 28/20*    (2009.01)
  *H04L 5/00*    (2006.01)
  *H04L 27/00*    (2006.01)
  *H04L 29/08*    (2006.01)
  *H04W 72/04*    (2009.01)

(52) U.S. Cl.
  CPC ........... *H04W 72/02* (2013.01); *H04L 5/0037* (2013.01); *H04W 28/20* (2013.01); *H04L 27/0006* (2013.01); *H04L 67/02* (2013.01); *H04W 72/0453* (2013.01)

(58) Field of Classification Search
  CPC ..................................................... H04W 72/02
  USPC .............................................. 455/452.1–454
  See application file for complete search history.

(56) References Cited

U.S. PATENT DOCUMENTS

| 6,697,603 B1 | 2/2004 | Lovinggood et al. |
| 7,986,715 B2 * | 7/2011 | Song .................. H04L 69/22 370/470 |
| 8,488,727 B1 | 7/2013 | Feng et al. |

(Continued)

FOREIGN PATENT DOCUMENTS

WO    WO 2012-024345 A2    2/2012

OTHER PUBLICATIONS

Office action for U.S. Appl. No. 13/875,833, dated Jul. 11, 2014, 5 pages.

(Continued)

*Primary Examiner* — Michael T Vu
(74) *Attorney, Agent, or Firm* — Lewis Roca Rothgerber Christie LLP

(57) ABSTRACT

A method for setting a filter coefficient for a communication system, which adjusts a frequency bandwidth by setting a filter coefficient of a wireless communication system over a communication network, is provided. In the method, a wireless communication system that includes a controller having a filter coefficient database and a web server, and a Digital Signal Processing device requests a filter coefficient and attribute information related to a set target frequency bandwidth from a management terminal. The wireless communication system receives the filter coefficient and the attribute information from the management terminal and stores the filter coefficient and the attribute information in the filter coefficient database. The wireless communication system sets a frequency bandwidth of the digital signal processing device as a set target frequency bandwidth based on the stored filter coefficient and the attribute information.

9 Claims, 7 Drawing Sheets

(56) References Cited

U.S. PATENT DOCUMENTS

| | | | |
|---|---|---|---|
| 8,774,153 | B1 | 7/2014 | Vargantwar et al. |
| 8,824,973 | B2 * | 9/2014 | Kleinhenz ............ H04L 1/0026 455/277.2 |
| 2002/0061763 | A1 | 5/2002 | Weissman |
| 2002/0075906 | A1 | 6/2002 | Cole et al. |
| 2003/0035474 | A1 | 2/2003 | Gorecki et al. |
| 2003/0195910 | A1 | 10/2003 | Corless et al. |
| 2006/0114979 | A1 | 6/2006 | Pedersen et al. |
| 2007/0072571 | A1 | 3/2007 | Sun et al. |
| 2007/0270988 | A1 | 11/2007 | Goldstein et al. |
| 2008/0273480 | A1 | 11/2008 | Chang |
| 2009/0215480 | A1 | 8/2009 | Kim et al. |
| 2009/0252350 | A1 | 10/2009 | Seguin |
| 2009/0257502 | A1 | 10/2009 | Ye et al. |
| 2010/0118921 | A1 | 5/2010 | Abdelmonem et al. |
| 2010/0285736 | A1 | 11/2010 | Gore et al. |
| 2011/0166846 | A1 | 7/2011 | Dou et al. |
| 2011/0244785 | A1 | 10/2011 | Scheinert |
| 2011/0268446 | A1 | 11/2011 | Cune et al. |
| 2011/0268449 | A1 | 11/2011 | Berlin et al. |
| 2011/0293104 | A1 | 12/2011 | Saplakoglu |
| 2012/0134666 | A1 | 5/2012 | Casterline et al. |
| 2012/0177026 | A1 | 7/2012 | Uyehara et al. |
| 2013/0101018 | A1 | 4/2013 | Chong et al. |
| 2013/0107973 | A1 | 5/2013 | Wang et al. |
| 2013/0208680 | A1 | 8/2013 | Kang |
| 2013/0260706 | A1 | 10/2013 | Singh |
| 2013/0326495 | A1 | 12/2013 | Reunamaki et al. |
| 2014/0328419 | A1 | 11/2014 | Kang |

OTHER PUBLICATIONS

Final Office action for U.S. Appl. No. 13/875,833, dated Mar. 11, 2015, 6 pages.

Office action for U.S. Appl. No. 13/828,691, dated Jul. 28, 2014, 8 pages.

* cited by examiner

METHOD FOR SETTING A FILTER COEFFICIENT FOR A COMMUNICATION SYSTEM

CROSS-REFERENCE TO RELATED APPLICATION

This application claims priority to Korean Patent Application No. 10-2011-0129508, filed on Dec. 6, 2011, and which is now Korean Patent No. 10-1156667, registered on Jun. 8, 2012, the contents of which are hereby incorporated by reference in their entirety.

BACKGROUND

Technical Field

The present invention relates generally to a method for setting a filter coefficient for a communication system, such as a wireless communication system. More particularly, the invention relates to a method for setting a filter coefficient for a communication system which downloads and sets a digital filter that is used to set a frequency bandwidth, for example, upon performing communications using public frequencies over the Internet in a wireless communication system that includes a digital signal processing device to which filters can be variably applied.

Description of Related Art

Generally, in multi-channel systems such as Code Division Multiple Access (CDMA) or Wideband CDMA (WCDMA) systems that have been widely used in wireless communications, a filter for frequency assignment that is serviced is fixed in advance and then used. In this case, such a wireless communication system supports only filters of a fixed bandwidth. Accordingly, the wireless communication system allows only signals with a previously designated bandwidth to pass therethrough and blocks the remaining signals.

U.S. Pat. No. 6,697,603 discloses a digital repeater that includes an analog to digital converter ("ADC"), a microcontroller unit ("MCU"), a digital signal processing ("DSP") device, and a digital to analog converter ("DAC"). To overcome usage constraints caused by different user environments between regions in the wireless communication system and improve the efficiency of products, the ADC converts an analog signal into a digital signal, the MCU and the DSP device are configured to include a software configurable program to select serviced frequency assignments for the digital signal and filter the digital signal, and the DAC converts the digital signal into an analog signal and outputs the analog signal.

However, a conventional filter coefficient setting method is problematic in that since it is a method of previously storing filters for serviced frequency assignments, and selecting a required filter from among the filters, it is generally not possible to in detail and freely set filtering for a band desired by a user in frequency assignments that are not supported by a particular product.

Therefore, the conventional filter coefficient setting method has the problem of making it generally not possible to effectively use unsupported frequencies when such frequencies are desired.

Further, the conventional filter coefficient setting method is problematic in that, in order to use public frequencies and special frequencies, the development of additional products for those frequency bands is required, and thus additional manpower and cost may also be required.

SUMMARY

Accordingly, embodiments of the present invention have been made keeping in mind the above issues, and an aspect of the present invention is to provide a filter coefficient setting method for a communication system which adjusts a frequency bandwidth by setting a filter coefficient of a wireless communication system over a communication network.

In accordance with an aspect of the present invention, there is provided method for setting a filter coefficient for a communication system, including utilizing a wireless communication system that includes a controller having a filter coefficient database and a web server, and a Digital Signal Processing device to request a filter coefficient and attribute information related to a set target frequency bandwidth from a management terminal; receiving the filter coefficient and the attribute information from the management terminal at the wireless communication system and storing the filter coefficient and the attribute information in the filter coefficient database; and utilizing the wireless communication system to set a frequency bandwidth of the digital signal processing device as a set target frequency bandwidth based on the stored filter coefficient and the attribute information.

In one embodiment, requesting the filter coefficient and the attribute information may include utilizing the wireless communication system to transmit a web page including status information to the management terminal; and utilizing the management terminal to display the web page received from the wireless communication system, and to set the filter coefficient and the attribute information based on the displayed web page.

In one embodiment, storing in the filter coefficient database may include setting a name of the filter coefficient received from the management terminal as a name of the filter coefficient that is stored by the wireless communication system.

In one embodiment, storing in the filter coefficient database may include setting a randomly generated character string as a name of the filter coefficient that is stored by the wireless communication system In one embodiment, receiving and storing the filter coefficient and the attribute information may include storing attribute information including a guard band of the filter coefficient.

In one embodiment, storing in the filter coefficient database may include receiving information associated with whether a guard band of the filter coefficient is included from the management terminal.

In one embodiment, setting the set target frequency bandwidth may include utilizing the wireless communication system to transmit one or more filter coefficients that include the stored filter coefficient and attribute information, and displaying the filter coefficients at the management terminal; and utilizing the wireless communication system to set a frequency bandwidth corresponding to a single filter coefficient selected by the management terminal, from among the one or more filter coefficients that are displayed as the set target frequency bandwidth.

In one embodiment, displaying the filter coefficients at the management terminal may include displaying attribute information including names of the filter coefficients and frequency bandwidths associated with the filter coefficients.

In one embodiment, setting the set target frequency bandwidth may further include utilizing the wireless communication system to delete one or more filter coefficients selected by the management terminal from among the one or more filter coefficients that are displayed, and to delete attribute information associated with the selected filter coefficients.

In accordance with another aspect of the present invention, there is provided a method for setting a filter coefficient for a communication system, including utilizing a modem box that includes a filter coefficient database and a web server to request a filter coefficient and attribute information related to a set target frequency bandwidth from a management terminal; receiving the filter coefficient and the attribute information from the management terminal at the modem box and storing the filter coefficient and the attribute information in the filter coefficient database; and utilizing the modem box to set a frequency bandwidth of a Digital Signal Processing device of a wireless communication system as a set target frequency bandwidth based on the stored filter coefficient and the attribute information.

In one embodiment, requesting the filter coefficient and the attribute information may include utilizing the modem box to transmit a web page including status information and to display the web page at the management terminal; and utilizing the management terminal to set the filter coefficient and the attribute information based on the displayed web page.

In one embodiment, storing in the filter coefficient database may include setting a name of the filter coefficient received from the management terminal as a name of the filter coefficient to be stored by the modem box.

In one embodiment, storing in the filter coefficient database may include setting a randomly generated character string as a name of the filter coefficient to be stored by the modem box.

In one embodiment, receiving and storing the filter coefficient and the attribute information may include storing attribute information including a guard band of the filter coefficient.

In one embodiment, storing in the filter coefficient database may include receiving information associated with whether a guard band of the filter coefficient is included from the management terminal.

In one embodiment, setting the set target frequency bandwidth may include utilizing the modem box to transmit one or more filter coefficients that include the stored filter coefficient and attribute information, and displaying the filter coefficients at the management terminal; and utilizing the modem box to set a frequency bandwidth corresponding to a single filter coefficient selected by the management terminal, from among the one or more filter coefficients that are displayed, as the set target frequency bandwidth, In one embodiment, displaying the filter coefficients at the management terminal may include displaying attribute information including names of the filter coefficients and frequency bandwidths associated with the filter coefficients.

In one embodiment, setting the set target frequency bandwidth may further include utilizing the wireless communication system to delete one or more filter coefficients selected by the management terminal from among the one or more filter coefficients that are displayed, and to delete attribute information associated with the selected filter coefficients.

In accordance with embodiments of the present invention, the after coefficient setting method for the communication system adjusts the frequency bandwidth by setting filter coefficients of a wireless communication system over a communication network, thus obtaining an advantage in that the band of the wireless communication system that uses Radio Frequency (RF) bands, such as public frequency bands and service bands of mobile communication companies, can be freely set using a single product.

Further, the filter coefficient setting method for the communication system according to embodiments of the present invention can freely set the band of the wireless communication system, so that there is an advantage in that, compared to the conventional technology, frequencies can be more efficiently used and development costs, production costs, and maintenance costs of the wireless communication system can be reduced.

BRIEF DESCRIPTION OF THE DRAWINGS

The above and other aspects and features of the present invention will be more clearly understood from the following detailed description taken in conjunction with the accompanying drawings, in which.

DETAILED DESCRIPTION

Figure 1:
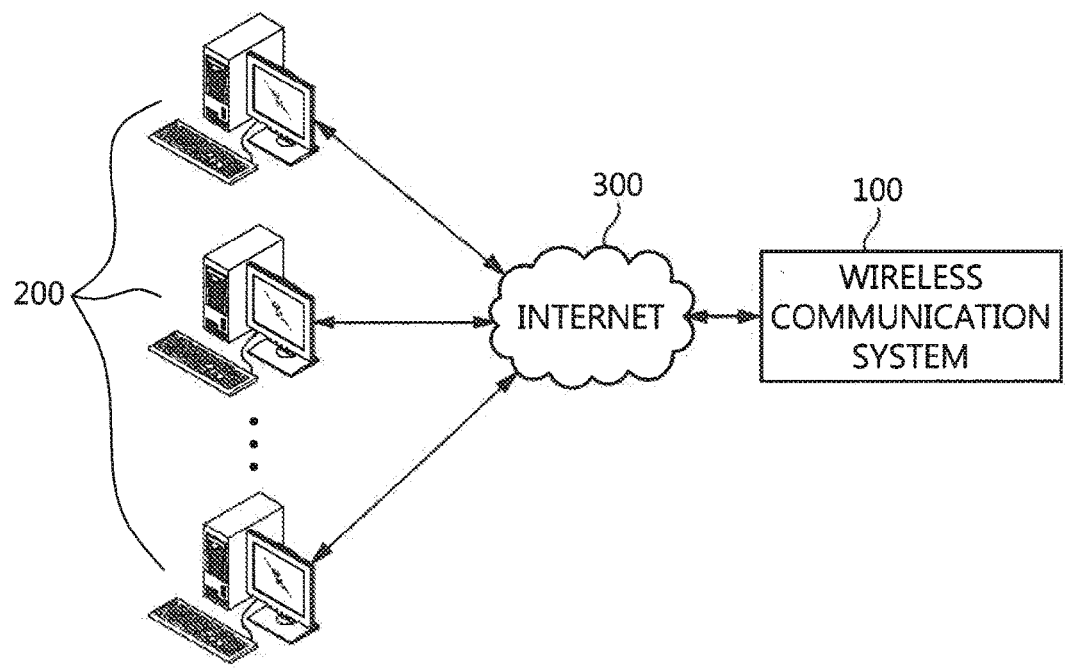
FIGS. 1 and 2 are diagrams showing a communication system according to a first embodiment of the present invention.

Exemplary embodiments of the present invention will be described in detail below, with reference to the accompanying drawings, to such an extent that those skilled in the art can easily implement the technical spirit of embodiments according to the present invention. Reference should be made to the drawings, in which the same reference numerals are used throughout the different drawings to designate the same or similar components. In the following description, redundant descriptions and detailed descriptions of known elements or functions that may unnecessarily make the gist of the present invention obscure may be omitted.

Figure 2:
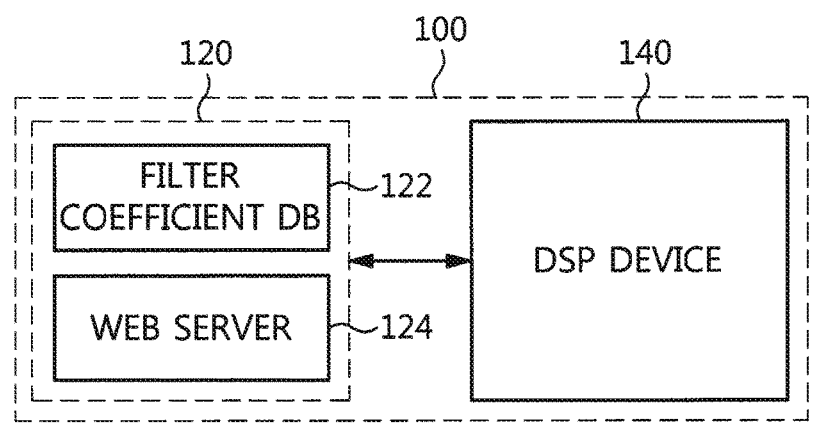

A configuration of a communication system for describing a filter coefficient setting method for the communication system will be first described in detail below. FIGS. 1 and 2 are diagrams showing a communication system according to a first embodiment of the present invention.

As shown in FIG. 1, the communication system is configured such that a wireless communication system 100 and one or more management terminals 200 are connected over the Internet 300.

The wireless communication system 100 includes a controller 120 for controlling internal operations of the system and a Digital Signal Processing (DSP) device 140 for performing digital signal processing. In this case, the controller 120 includes a web server 124 and a filter coefficient database 122, The web server 124 transmits status information data of the wireless communication system 100 stored in the filter coefficient database 122 to the management terminals 200 in the form of a web page. That is, the web server 124 allows the manager of the wireless communication system 100 to check the status of the wireless communication system 100 through web browsers of each management terminal 200 and to set details.

The filter coefficient database 122 stores data related to the wireless communication system 100. In this case, the filter coefficient database 122 stores data that includes status information of the wireless communication system 100 and filter coefficients, attribute information, etc. that are received from the management terminal 200.

Each management terminal 200 includes a web browser capable of displaying a web page on which the status information of the wireless communication system 100 is provided. In this regard, the management terminal 200 is implemented as a device enabling data communication over the Internet 300, for example, a personal computer, a notebook computer, or a Personal Digital Assistant (PDA) terminal.

Figure 3:
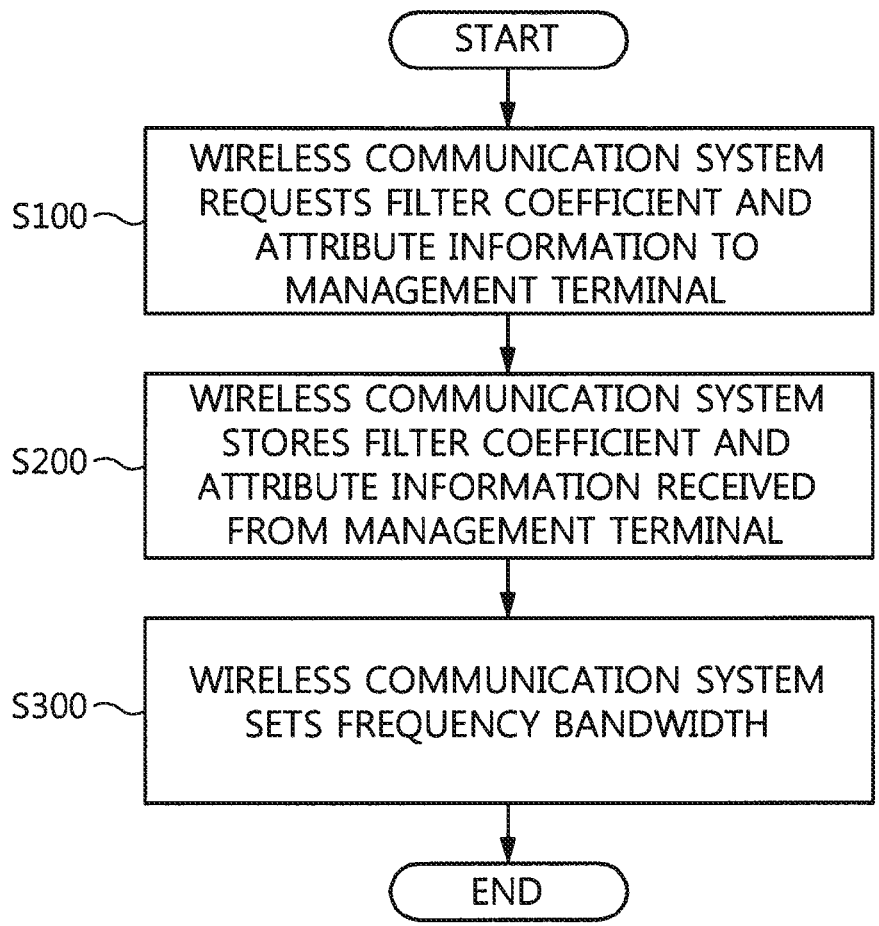
FIGS. 3 and 4 are flowcharts showing a filter coefficient setting method for a communication system according to the first embodiment of the present invention.
Figure 4:
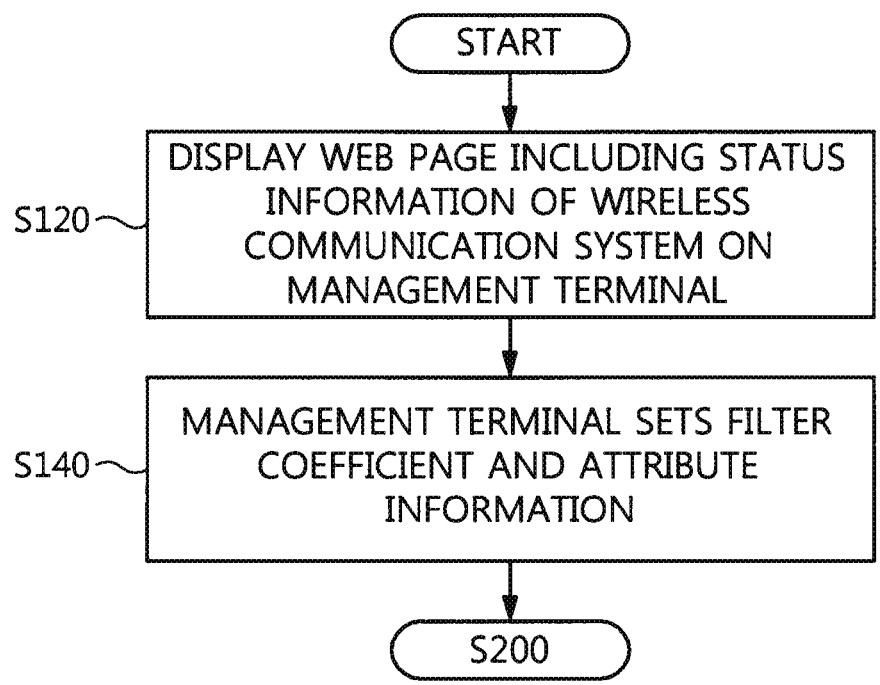

Hereinafter, a filter coefficient setting method for a communication system according to a first embodiment of the present invention will be described in detail with reference to the attached drawings. FIGS. 3 and 4 are flowcharts showing a filter coefficient setting method for a communication system according to a first embodiment of the present invention.

First, the wireless communication system 100 requests a filter coefficient and attribute information related to a set target frequency bandwidth from a relevant management terminal 200 at step S100. The step of requesting the filter coefficient and the attribute information will be described in detail below, with reference to FIG. 4.

When a manager requests the setting of or a change in the frequency bandwidth of the wireless communication system 100 via the management terminal 200, the wireless communication system 100 transmits a web page including its own status information to the management terminal 200. The management terminal 200 outputs the web page received from the wireless communication system 100, and displays the status information of the wireless communication system 100 on a screen at step S120.

The manager sets a filter coefficient and attribute information using the management terminal 200 at step S140. In this case, the manager sets the filter coefficient and the attribute information with reference to or based on the displayed status information from the wireless communication system 100. In this case, the management terminal 200 receives attribute information, including the description or the features of the filter coefficient and the name of the filter coefficient, from the manager. The management terminal 200 may omit the reception of the description or the features of the filter coefficient and the name of the filter coefficient. The management terminal 200 receives information about whether the guard band of the filter coefficient is included in the attribute information, together with the attribute information, from the manager. Here, the manager may check the filter coefficient and the attribute information, set via the management terminal 200, using the web browser.

The wireless communication system 100 stores the filter coefficient and the attribute information received from the management terminal 200 at step S200. That is, the wireless communication system 100 receives the filter coefficient and the attribute information, which were set in step S140, from the management terminal 200. The wireless communication system 100 stores the filter coefficient and the attribute information in the filter coefficient database 122.

In this case, the wireless communication system 100 may set the name of the filter coefficient, input from the management terminal 200, as the name of the filter coefficient to be stored, and may then store the filter coefficient. When the name of the filter coefficient is not input from the management terminal 200, the wireless communication system 100 may set a randomly generated character string as the name of the filter coefficient, and then stores the filter coefficient.

Together with the filter coefficient, the wireless communication system 100 stores attribute information including the guard band of the filter coefficient. In this regard, the wireless communication system 100 receives from the management terminal 200 information about whether the guard band of the filter coefficient is included in the attribute information.

The wireless communication system 100 sets the frequency bandwidth at step S300. That is, the wireless communication system 100 sets the frequency bandwidth of the DSP device 140 as the set target frequency bandwidth, on the basis of the filter coefficient and the attribute information that have been stored. The step of setting the frequency bandwidth will be described in detail below.

The wireless communication system 100 transmits one or more filter coefficients, including the stored filter coefficient and attribute information, to the management terminal 200. The management terminal 200 displays the received filter coefficients on the screen. In this case, the management terminal 200 displays attribute information, including the names of the filter coefficients and the frequency bandwidths associated with the filter coefficients.

The manager selects filter coefficients corresponding to a desired frequency band from among the one or more filter coefficients displayed on the management terminal 200. That is, the manager inputs a frequency corresponding to at least one of the start, middle, and end frequencies of the desired frequency band using the management terminal 200, and sets the bandwidth of the frequency band. In this case, the setting of the bandwidth is executed in such a way that the bandwidth is selected on the basis of pieces of information that have been input together when the filter coefficients are stored, that is, the descriptions or features of the filter coefficients, the names of the filter coefficients, and information about whether the guard bands of the filter coefficients are included in the attribute information.

The management terminal 200 transmits the filter coefficients selected by the manager and the attribute information thereof to the wireless communication system 100. The wireless communication system 100 sets the frequency bandwidth corresponding to the filter coefficients received from the management terminal 200 as the set target frequency bandwidth. In this regard, the wireless communication system 100 may delete one or more filter coefficients selected by the management terminal 200 from among the one or more filter coefficients that are displayed, and may also delete pieces of attribute information, such as the descriptions or features of the selected filter coefficients, the names of the filter coefficients, and information about whether the guard bands of the filter coefficients are included in the attribute information.

Figure 5:
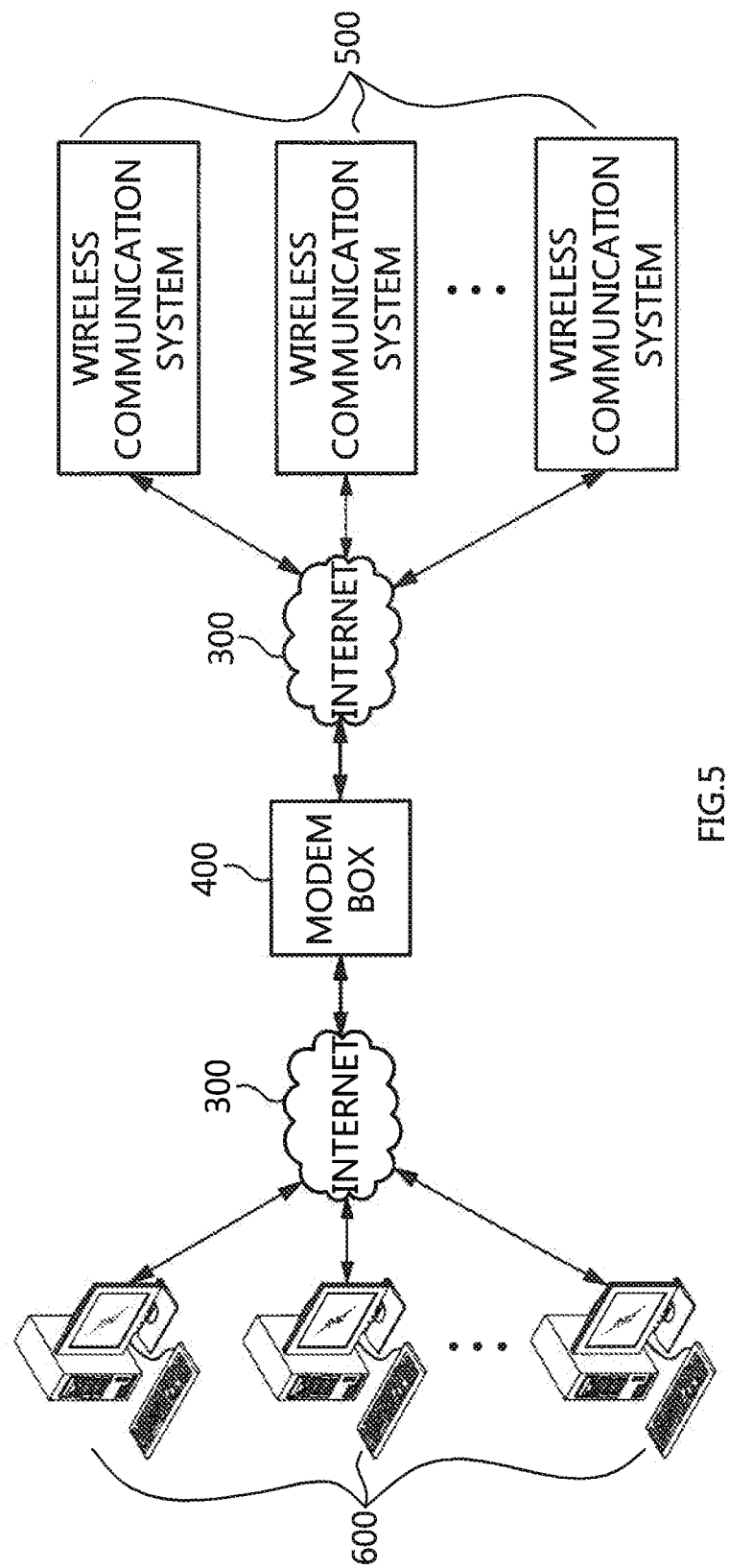
FIGS. 5 to 7 are diagrams showing a communication system according to a second embodiment of the present invention.
Figure 6:
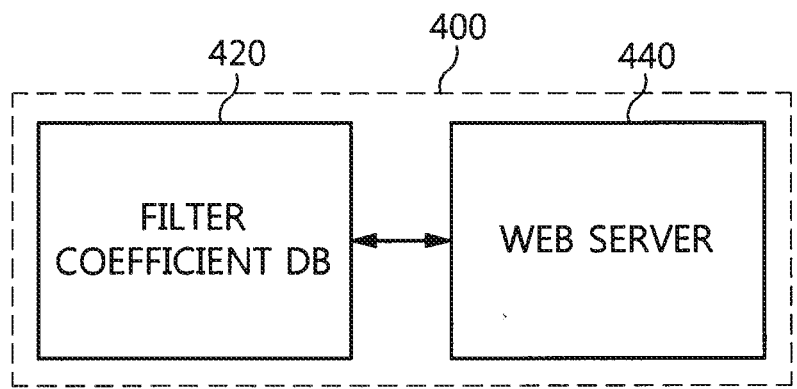
Figure 7:
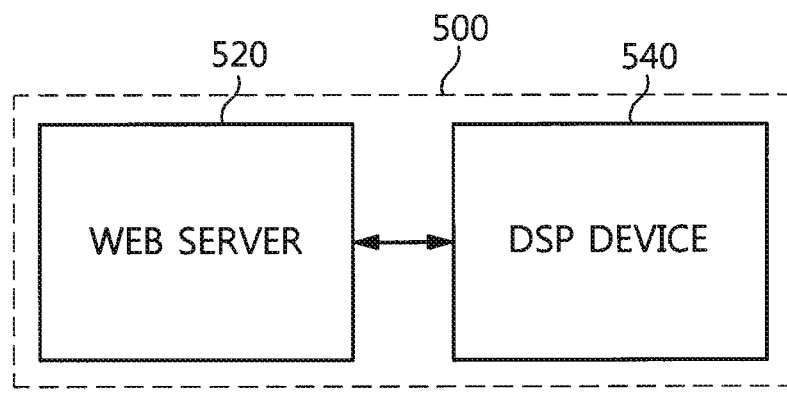

FIGS. 5 to 7 are diagrams showing a communication system according to a second embodiment of the present invention.

As shown in FIG. 5, the communication system s configured such that a modem box 400, one or more wireless communication systems 500, and one or more management terminals 600 are connected over the Internet 300. In this case, as shown in FIG. 6, the modem box 400 is a multi-wireless communication system monitoring device including a filter coefficient database 420 and a web server 440. As shown in FIG. 7, each wireless communication system 500 includes a web server 520 and a digital signal processing (DSP) device 540 for performing digital signal processing. That is, the second embodiment of the present invention is configured such that part of the function of the wireless communication system 500 may be performed by the modem box 400. In this case, the individual components of the modem box 400 and the wireless communication system 500 may be the same as those of the wireless communication system 100 in the above first embodiment, and thus a detailed description thereof will be omitted.

Figure 8:
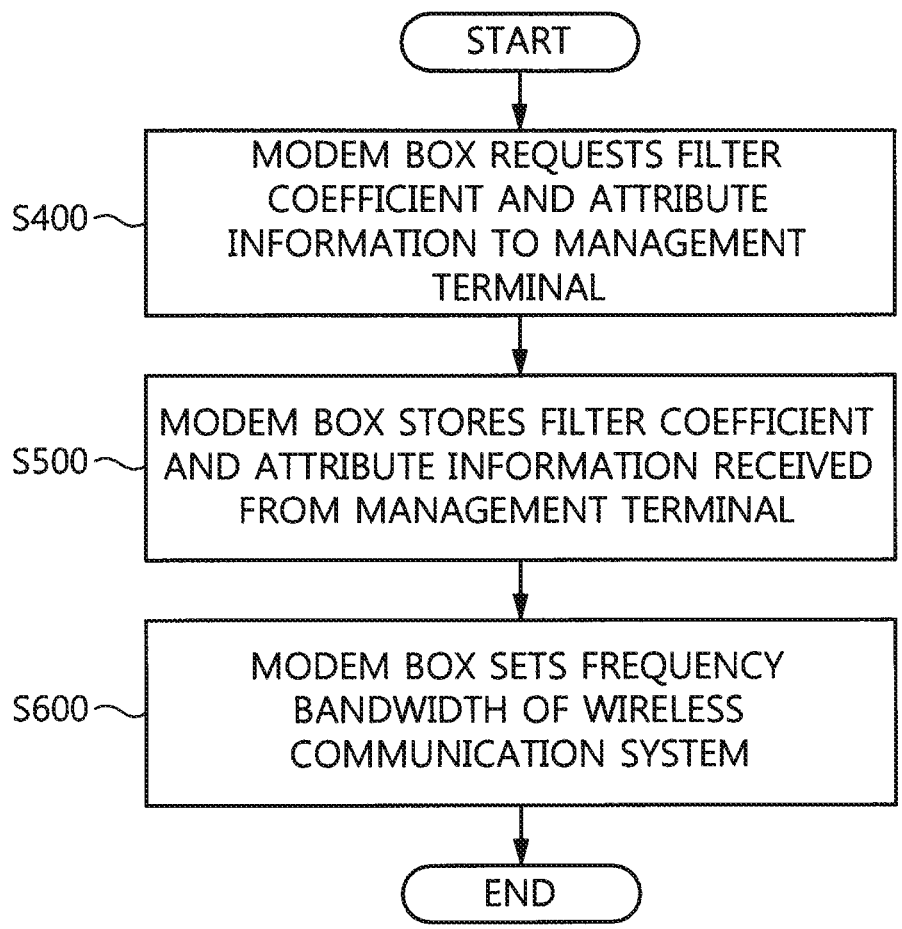
FIGS. 8 and 9 are flowcharts showing a filter coefficient setting method for a communication system according to the second embodiment of the present invention.
Figure 9:
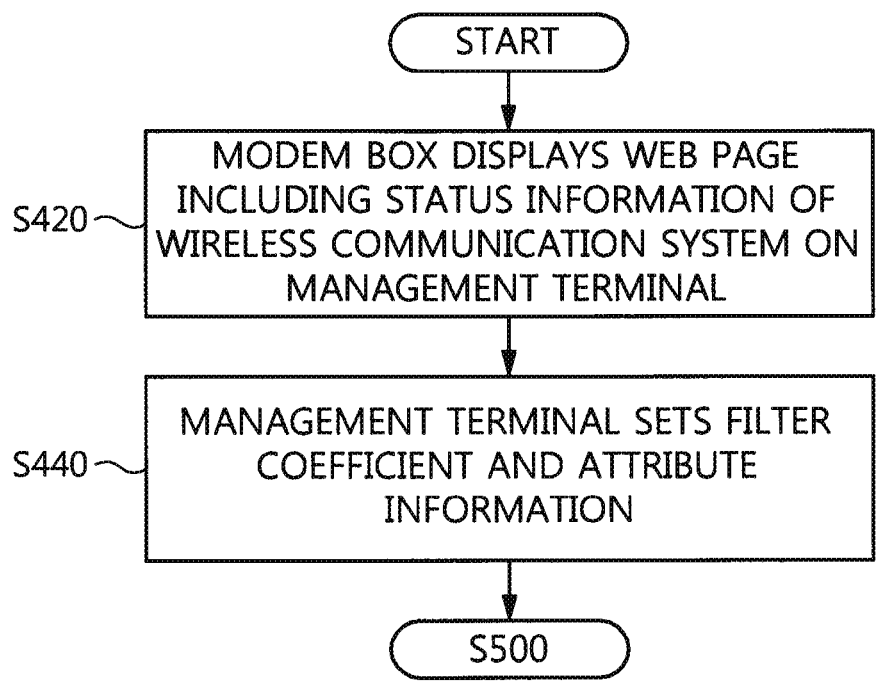

Hereinafter, a filter coefficient setting method for a communication system according to the second embodiment of the present invention will be described in detail with reference to the attached drawings. FIGS. 8 and 9 are flowcharts showing a filter coefficient setting method for a communication system according to the second embodiment of the present invention.

First, the modem box 400 requests a filter coefficient and attribute information related to a set target frequency bandwidth from a relevant management terminal 600 at step S400. That is, when a manager requests the setting of or a change in the frequency bandwidth of the modem box 400 via the management terminal 600, the modem box 400 transmits a web page including its own status information to the management terminal 600. The management terminal 600 outputs the web page received from the modem box 400, and displays the status information of the modem box 400 on the screen at step S420.

The manager sets the filter coefficient and attribute information using the management terminal 600 at step S440. In this case, the manager sets the filter coefficient and the attribute information with reference to the displayed status information of the modem box 400. In this regard, the management terminal 600 receives attribute information, including the description or features of the filter coefficient and the name of the filter coefficient, from the manager. The management terminal 600 may omit the reception of the description or the features of the filter coefficient and the name of the filter coefficient. The management terminal 600 receives information about whether the guard band of the filter coefficient is included in the attribute information, together with the attribute information, from the manager. Here, the manager may check the filter coefficient and the attribute information, set via the management terminal 600, using the web browser.

The modem box 400 stores the filter coefficient and the attribute information received from the management terminal 600 at step S500. That is, the modem box 400 receives the filter coefficient and the attribute information, which were set in step S440, from the management terminal 600. The modem box 400 stores the filter coefficient and the attribute information in the filter coefficient database 420.

In this case, the modem box 400 may set the name of the filter coefficient, input from the management terminal 600, as the name of the filter coefficient to be stored, and may then store the filter coefficient. When the name of the filter coefficient is not input from the management terminal 600, the modem box 400 may set a randomly generated character string as the name of the filter coefficient, and then store the filter coefficient.

Together with the filter coefficient, the modem box 400 stores the attribute information, including the guard band of the filter coefficient. Here, the modem box 400 receives from the management terminal 600 information about whether the guard band of the filter coefficient is included in the attribute information.

The modem box 400 sets the frequency bandwidth at step S600. That is, the modem box 400 sets the frequency bandwidth of the DSP device 540 of the wireless communication system 500 at the set target frequency bandwidth, on the basis of the filter coefficient and the attribute information that have been stored. The step of setting the frequency bandwidth will be described in detail below.

The modem box 400 transmits one or more filter coefficients, including the stored filter coefficient and attribute information, to the management terminal 600. The management terminal 600 displays the received filter coefficients on the screen. In this case, the management terminal 600 displays attribute information, including the names of the filter coefficients and the frequency bandwidths associated with the filter coefficients.

The manager selects filter coefficients corresponding to a desired frequency band from among the one or more filter coefficients displayed on the management terminal 600. That is, the manager inputs a frequency corresponding to at least one of the start, middle and end frequencies of the desired frequency band using the management terminal 600, and sets the bandwidth of the frequency band. In this case, the setting of the bandwidth is executed in such a way that the bandwidth is selected on the basis of pieces of information that have been input together when the filter coefficients are stored, that is, the descriptions or features of the filter coefficients, the names of the filter coefficients, and information about whether the guard bands of the filter coefficients are included in the attribute information.

The management terminal 600 transmits the filter coefficients selected by the manager and the attribute information thereof to the modem box 400. The modem box 400 sets the frequency bandwidth corresponding to the filter coefficients received from the management terminal 600 as the set target frequency bandwidth. In this regard, the modem box 400 may delete one or more filter coefficients selected by the management terminal 600 from among the one or more filter coefficients that are displayed, and may also delete pieces of attribute information, such as the descriptions or features of the selected filter coefficients, the names of the filter coefficients, and information about whether the guard bands of the filter coefficients are included in the attribute information. The modem box 400 sets the frequencies by loading the filter coefficients onto the DSP device 540 of the wireless communication system 500.

As described above, the filter coefficient setting method for the communication system adjusts the frequency bandwidth by setting the filter coefficients of a wireless communication system over a communication network. Therefore, a band of a wireless communication system that uses Radio Frequency (RF) bands, such as a public frequency band and the service bands of mobile communication companies, can be freely set using a single product.

Further, since the filter coefficient setting method for the communication system can freely set a band of a wireless communication system, there is an advantage in that compared to the conventional technology, frequencies can be efficiently used, and development costs, production costs, and maintenance costs of a wireless communication system can also be reduced.

Although exemplary embodiments of the present invention have been disclosed for illustrative purposes, those skilled in the art will appreciate that various modifications, additions, and substitutions are possible, without departing from the scope and spirit of the invention as disclosed in the accompanying claims, and their equivalents.

The invention claimed is:

1. A method for setting a filter coefficient for a communication system, comprising:
utilizing a wireless communication system that includes a controller having a filter coefficient database and a web server, and a digital signal processing device to request a filter coefficient and attribute information related to a set target frequency bandwidth from a management terminal;
receiving the filter coefficient and the attribute information from the management terminal at the wireless communication system and storing the filter coefficient and the attribute information in the filter coefficient database; and
utilizing the wireless communication system to set a frequency bandwidth of the digital signal processing device as the set target frequency bandwidth based on the stored filter coefficient and the attribute information.

2. The method of claim 1, wherein requesting the filter coefficient and the attribute information comprises:
utilizing the wireless communication system to transmit a web page including status information to the management terminal; and
utilizing the management terminal to display the web page received from the wireless communication system, and to set the filter coefficient and the attribute information based on the displayed web page.

3. The method of claim 1, wherein storing in the filter coefficient database comprises setting a name of the filter coefficient received from the management terminal as a name of the filter coefficient that is stored by the wireless communication system.

4. The method of claim 1, wherein storing in the filter coefficient database comprises setting a randomly generated character string as a name of the filter coefficient that is stored by the wireless communication system.

5. The method of claim 1, wherein receiving and storing the filter coefficient and the attribute information comprises storing attribute information including a guard band of the filter coefficient.

6. The method of claim 1, wherein storing in the filter coefficient database comprises receiving information associated with whether a guard band of the filter coefficient is included from the management terminal.

7. The method of claim 1, wherein setting the set target frequency bandwidth comprises:
utilizing the wireless communication system to transmit one or more filter coefficients that include the stored filter coefficient and attribute information, and displaying the filter coefficients at the management terminal; and
utilizing the wireless communication system to set a frequency bandwidth corresponding to a single filter coefficient selected by the management terminal, from among the one or more filter coefficients that are displayed as the set target frequency bandwidth.

8. The method of claim 7, wherein displaying the filter coefficients at the management terminal comprises displaying attribute information including names of the filter coefficients and frequency bandwidths associated with the filter coefficients.

9. The method of claim 7, wherein setting the set target frequency bandwidth further comprises utilizing the wireless communication system to delete one or more filter coefficients selected by the management terminal from among the one or more filter coefficients that are displayed, and to delete attribute information associated with the selected filter coefficients.

* * * * *